United States Patent
Chen et al.

(10) Patent No.: US 8,688,117 B2
(45) Date of Patent: Apr. 1, 2014

(54) SEAMLESS HANDOVER AND LOAD BALANCE BETWEEN MACRO BASE STATIONS AND PUBLICLY ACCESSIBLE FEMTO BASE STATIONS

(75) Inventors: Wei-Peng Chen, Santa Clara, CA (US); Chenxi Zhu, Santa Clara, CA (US); Yuji Kojima, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 999 days.

(21) Appl. No.: 12/395,823

(22) Filed: Mar. 2, 2009

(65) Prior Publication Data

US 2009/0310568 A1    Dec. 17, 2009

Related U.S. Application Data

(60) Provisional application No. 61/061,544, filed on Jun. 13, 2008.

(51) Int. Cl.
*H04W 36/00* (2009.01)
*H04W 4/00* (2009.01)

(52) U.S. Cl.
USPC ............ 455/436; 455/438; 370/329; 370/331; 370/332

(58) Field of Classification Search
None
See application file for complete search history.

(56) References Cited

U.S. PATENT DOCUMENTS

| | | | |
|---|---|---|---|
| 7,613,444 B2 * | 11/2009 | Lindqvist et al. | 455/403 |
| 2004/0219932 A1 * | 11/2004 | Verteuil | 455/456.2 |
| 2007/0140163 A1 | 6/2007 | Meier et al. | |
| 2007/0160017 A1 | 7/2007 | Meier et al. | |
| 2008/0095067 A1 | 4/2008 | Rao | |
| 2008/0130555 A1 * | 6/2008 | Kalhan | 370/329 |
| 2008/0132239 A1 * | 6/2008 | Khetawat et al. | 455/438 |
| 2008/0153497 A1 * | 6/2008 | Kalhan | 455/436 |
| 2008/0207170 A1 * | 8/2008 | Khetawat et al. | 455/411 |
| 2009/0052395 A1 * | 2/2009 | Bao et al. | 370/331 |

FOREIGN PATENT DOCUMENTS

| | | | | |
|---|---|---|---|---|
| JP | 2007208915 | | 8/2007 | H04B 1/707 |
| WO | WO 2008/066928 | | 6/2008 | H04Q 7/38 |

OTHER PUBLICATIONS

Japanese Office Action with English translation; Application No. 2009-141687; pp. 4, Jan. 8, 2013.
802.163™ IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands and Corrigendum 1, dated Feb. 28, 2006, 859 pages. (Filed in 2 parts—Part I and Part II).
WiMAX Forum Network Architecture (Stage 2: Architecture Tenets, Reference Model and Reference Points) [WiMAX Interworking with DSL], Release 1, Version 1.2, dated Jan. 11, 2008, 8 pages.

(Continued)

*Primary Examiner* — Jinsong Hu
*Assistant Examiner* — William Nealon
(74) *Attorney, Agent, or Firm* — Baker Botts L.L.P.

(57) ABSTRACT

The teachings of the present disclosure relate to seamless handover between macro base stations and publicly accessible femto base stations that includes scheduling a null period in a femto base station's communications activity. The method also includes monitoring mobile station activity during the null period at the femto base station. A candidate mobile station is identified based on the monitoring. An identifier of the candidate mobile station is transmitted from the femto base station to a macro base station. The identifier may be used to initiate handover of service of the candidate mobile station from the macro base station to the femto base station.

19 Claims, 7 Drawing Sheets (56) References Cited

OTHER PUBLICATIONS

WiMAX Forum Network Architecture (Stage 2: Architecture Tenets, Reference Model and Reference Points) [3GPP—WiMAX Interworking], Release 1, Version 1.2, dated Jan. 11, 2008, 10 pages.
WiMAX Forum Network Architecture (Stage 2: Architecture Tenets, Reference Model and Reference Points) [3GPP2—WiMAX Interworking], Release 1, Version 1.2, dated Jan. 11, 2008, 10 pages.
WiMAX Forum Network Architecture (Stage 2: Architecture Tenets, Reference Model and Reference Points) [Stage 2 and Stage 3 Abbreviations], Release 1, Version 1.2, dated Jan. 11, 2008, 9 pages.
WiMAX Forum Network Architecture (Stage 2: Architecture Tenets, Reference Model and Reference Points) [Part 0], Release 1, Version 1.2, dated Jan. 11, 2008, 8 pages.
WiMAX Forum Network Architecture (Stage 2: Architecture Tenets, Reference Model and Reference Points) [Part 1], Release 1, Version 1.2, dated Jan. 11, 2008, 36 pages.
WiMAX Forum Network Architecture (Stage 2: Architecture Tenets, Reference Model and Reference Points) [Part 2], Release 1, Version 1.2, dated Jan. 11, 2008, 160 pages.
WiMAX Forum Network Architecture (Stage 2: Architecture Tenets, Reference Model and Reference Points) [Part 3 Informative Annex], Release 1, Version 1.2, dated Jan. 11, 2008, 28 pages.
WiMAX Forum Network Architecture (Stage 3: Detailed Protocols and Procedures), Release 1, Version 1.2, dated Jan. 11, 2008, 571 pages. (Filed in 2 parts—Part I and Part II).
WiMAX Forum Network Architecture (Stage 3: Detailed Protocols and Procedures), [Annex: WiMAX—3GPP2 Interworking], Release 1, Version 1.2, dated Jan. 11, 2008, 16 pages.
WiMAX Forum Network Architecture (Stage 3: Detailed Protocols and Procedures), [Annex: WiMAX—3GPP Interworking], Release 1, Version 1.2, dated Jan. 11, 2008, 11 pages.
WiMAX Forum Network Architecture (Stage 3: Detailed Protocols and Procedures), [Annex: Prepaid Accounting] Release 1, Version 1.2, dated Jan. 11, 2008, 43 pages.
WiMAX Forum Network Architecture (Stage 3: Detailed Protocols and Procedures), [Annex: R6/R8 ASN Anchored Mobility Scenarios] Release 1, Version 1.2, dated Jan. 11, 2008, 15 pages.
Wei-Peng Chen, et al, U.S. Appl. No. 12/385,798, filed Mar. 2, 2009 entitled "Seamless Handover Between Macro Base Stations and Publicly Accessible Femto Base Stations", 51 pages.

* cited by examiner

SEAMLESS HANDOVER AND LOAD BALANCE BETWEEN MACRO BASE STATIONS AND PUBLICLY ACCESSIBLE FEMTO BASE STATIONS

RELATED APPLICATION

This application claims benefit under 35 U.S.C. §119(e) of U.S. Provisional Application Ser. No. 61/061,544, titled "Handover and Load Balance Between Macro Base Stations and Public Accessible Femto-Base Stations," filed Jun. 13, 2008, by Wei-Peng Chen et al.

TECHNICAL FIELD

The present invention relates generally to wireless networking, and more particularly to seamless handover and load balance between macro base stations and publicly accessible femto base stations.

BACKGROUND

IEEE 802.16 is an emerging suite of standards for Broadband Wireless Access (BWA) commonly known as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines a high-throughput packet data network radio interface capable of supporting several classes of Internet Protocol (IP) applications and services including isochronous applications such as Voice Over IP (VoIP) and applications with burst data access profiles such as Transfer Control Protocol (TCP) applications. The standards defined in IEEE 802.16-2004 and IEEE 802.16-2005 are both hereby incorporated by reference.

The basic WiMAX network coverage is provided using an approach similar to other mobile wireless technologies (e.g., using high power macro base stations). In order to increase the intra-cell coverage and capacity, distributed small base station entities have been considered. Depending on the number of target users and the type of applications envisioned, these small base station entities have been defined by the WiMAX industry as nano, pico or femto base stations. The femto base station (fBS) is the smallest base station entity. An fBS is, in essence, a small WiMAX MBS that a user can purchase and install in his home or office. It basically provides the user's MS the same air interface function as an MBS based on the IEEE 802.16 standard. Compared to a MBS, the fBS is a low-cost, low-power radio system having reduced capabilities. The users can put the fBS in their building to boost bandwidth and coverage area and enable new applications such as fixed/mobile convergence. Being located in the user's building, the fBS often provides higher signal strength and better link quality than the MS would get from the MBS outside the user's building.

The fBS is envisioned as being installed at the customer's premise by the customer with little or no support from the network operator. This is different than other types of small base station entities, which are typically installed and commissioned by the network operator. Since fBSs are operated in a home or office environment, it is natural to consider fBSs as private equipment which is only accessible by the owners' devices. However, in certain situations the owners of fBSs may provide service to the MSs of non-owners. Such fBSs may be referred to as public accessible fBSs.

SUMMARY

The teachings of the present disclosure relate to seamless handover between macro base stations and publicly accessible femto base stations that includes scheduling a null period in a femto base station's communications activity. The method also includes monitoring mobile station activity during the null period at the femto base station. A candidate mobile station is identified based on the monitoring. An identifier of the candidate mobile station is transmitted from the femto base station to a macro base station. The identifier may be used to initiate handover of service of the candidate mobile station from the macro base station to the femto base station.

According to another embodiment, a system is provided for seamless handover between macro base stations and publicly accessible base stations. A femto base station is provided. The femto base station is operable to schedule a null period in a femto base station's communications activity. The femto base station may monitor mobile station activity during the null period. The femto base station may then identify a candidate mobile station. An identifier of the candidate mobile station may be transmitted from the femto base station to a macro base station. This identifier may be used to initiate handover of service of the candidate mobile station from the macro base station to the femto base station.

Technical advantages of particular embodiments include identification of femto base stations that are able to serve nearby mobile stations. By identifying nearby femto base stations, mobile stations do not have to spend time trying to find a femto station to connect to. Additionally, by having a femto base station service mobile stations, additional capacity may be freed on the macro base station network.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
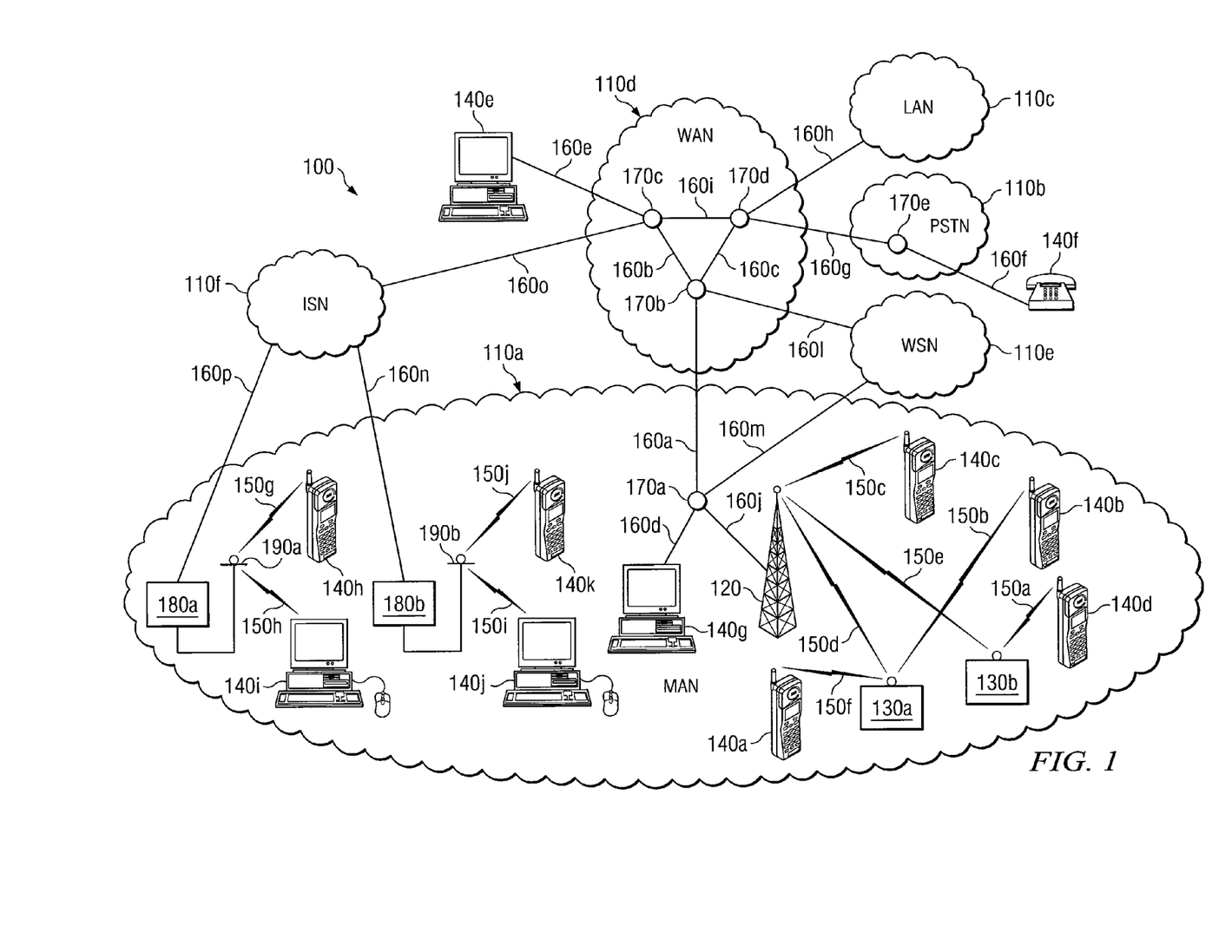
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate Internet access, wireless access (e.g., a WiMAX service) online gaming, file sharing, peer-to-peer file sharing (P2P), voice over Internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include macro base stations (MBSs), such as MBS 120, relay stations (RSs), such as RSs 130, and femto base stations (fBSs), such as fBSs 190.

For simplicity and ease of discussion the remainder of this description may use a simplified nomenclature for the various entities that may be involved. 'Owner' may refer to the entity that has purchased an fBS or to whom the fBS is registered. 'User' may refer to the entity that is consuming wireless resources. 'Access service' may refer to the service that the owner uses to access external networks, such as the Internet. 'Access service provider' or 'Internet service provider' (ISP) may refer to the entity that provides the access service for the owner. 'Carrier service' may refer to the service that the user uses for wireless access, such as WiMAX. 'Carrier service provider' or 'wireless service provider' (WSP) may refer to the entity that provides the carrier service for the user. While this nomenclature is used for simplicity, it does not represent the entire scope of all possible embodiments. For example, an owner may also be a user and the ISP may also be the carrier service provider. As another example, the ISP may not be directly providing the owner with Internet access (e.g., the ISP may provide a building with Internet access, the building owner may then provide the fBS owner with Internet access).

The embodiment depicted in FIG. 1 includes fBSs 190. fBSs 190 may, in essence, be small base stations purchased (or leased) by the owner. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

Part of the installation process may include providing the fBS with network access for its backhaul connection. As can be seen in FIG. 1, fBSs 190 are connected to network access devices 180. This connection provides fBSs 190 with their backhaul connection to the carrier service provider's network, network 110e. Network access devices 180 may provide the owner with general network access. As may be apparent, fBSs 190 do not use dedicated back-haul communication lines but rather use the owner's existing network access. Depending on the embodiment and scenario the ISP and the WSP may be the same entity.

While fBSs 190 may use the owner's existing network access, similar to a traditional wireless access point, as a user leaves the fBS's coverage area they may be handed-off to RS 130 or MBS 120. The hand-off may be possible because the user's MS is able to use the same wireless interface with fBS 190 and RS 130 or MBS 120. Furthermore, unlike a traditional WiFi wireless access point, operated in a license-exempt band, the fBS may be operated in a licensed band.

Within a network using a wireless protocol (e.g., 802.16j, or 802.16m), such as network 110a, particular embodiments may allow for fBSs 190 to be public or private. A public fBS may allow any of endpoints 140 to connect thereto; a private fBS may only allow connections from those endpoints 140 who are authorized to connect thereto. For example, fBS 190a may be a private fBS that the owner has installed in his home. The owner of fBS 190a may have authorized endpoints 140h and 140i (which may, for example be his phone (e.g., a mobile phone) and his computer (depicted as a desk-top computer in FIG. 1)) to connect to fBS 190a. Accordingly, only these two endpoints may connect to fBS 190a. On the other hand, fBS 190b may be a public fBS, installed at a business. Accordingly, any of endpoints 140 within the coverage area of fBS 190b may connect thereto.

Certain methods described with respect to FIGS. 3-8 may provide seamless handover of service of endpoints 140 from MBS 120 to fBS 190. In particular, the methods provide for transmission of information related to nearby public fBSs to endpoints 140 so that a handover of service may be performed from MBS 120.

Each of endpoints 140 is connected to one of MBS 120, RSs 130, or fBSs 190. For simplicity, the component to which an endpoint is connected may be referred to as an access station. For example, the access station for endpoint 140h is fBS 190a. Between each endpoint 140 and its respective access station there may be a wireless connection 150, sometimes referred to as an access link. These wireless connections may be referred to as access links because they provide the endpoint with access to a network. Similarly, between each RS and MBS (or between two RSs) there may be a wireless connection 150, sometimes referred to as a relay link. This wireless connection may be referred to as a relay link because it relays communications from the access link to/from the MBS.

A wireless connection may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the amount of resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. Accordingly, it may be desirable to know where a particular fBS has been configured. In particular embodiments, uplink sounding may be used to estimate the channel gain and interference strength between MBS 150, and multiple RSs 130 and fBSs 190. The uplink sounding may, therefore, be used in determining the quality and/or efficiency of the various wireless connections.

In particular embodiments, endpoints 140 may select which access station (e.g., one of MBS 120, RSs 130, or fBSs 190) to connect to based on, at least in part, the spectrum efficiency of an access link with the respective access station. The spectrum efficiency may be determined using the Modulation and Coding Scheme (MCS) level which may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/second. Furthermore, depending on the embodiment, network 110a may be configured to make an fBS appear more desirable as an access station to encourage MSs to connect thereto if possible.

Although communication system 100 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration and simplicity, network 110a is a MAN that may be implemented, at least in part, via WiMAX; network 110b is a PSTN; network 110c is a LAN; network 110d is a WAN, such as the Internet; network 110e is a carrier service network (CSN) which may be operated by the carrier service provider responsible for network 110a; and network 110f is an access service network (ASN) which may be operated by an Internet service provider (ISP) responsible for providing its users with Internet access. Though not depicted, both CSN network 110e and ASN network 110f may include servers, modems, gateways and an other components that may be needed to provide their respective service. While networks 110 have been depicted as six separate networks, depending on the scenario any two, or more, of the networks may be a single network. For example, the WSP and the ISP may be the same business entity which may maintain the necessary components for both services on the same network.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX MBS along with one or more RSs and fBSs may allow network 110a to cover the larger geographic area associated with a MAN while using a relatively small number of wired links. More specifically, by properly arranging MBS 120, multiple RSs 130 and fBSs 190 around a metropolitan area, the multiple access stations may use wireless connections 150 or existing wired links to communicate with MBS 120, and wireless connection 150 to communicate with wireless endpoints 140 throughout the metropolitan area. Then MBS 120 may, through wired connection 160a, communicate with other MBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's network access, provided by the owner's ISP's network (e.g., network 110f), for its backhaul connection to the carrier service provider's network (e.g., network 110e).

Nodes 170 may include any combination of network components, modems, session border controllers, gatekeepers, ASN gateways, CSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another MBS that is wired to MBS 120 via link 160j and to network 110d via link 160a. As a MBS, node 170a may be able to establish several wireless connections of its own with various other MBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, Node 170e works to translate communications between the various protocols used by different networks.

Network access devices 180 may provide network access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide network access to components other than fBSs 190. For example, the owner may connect his personal computer to network access device 180 to surf the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
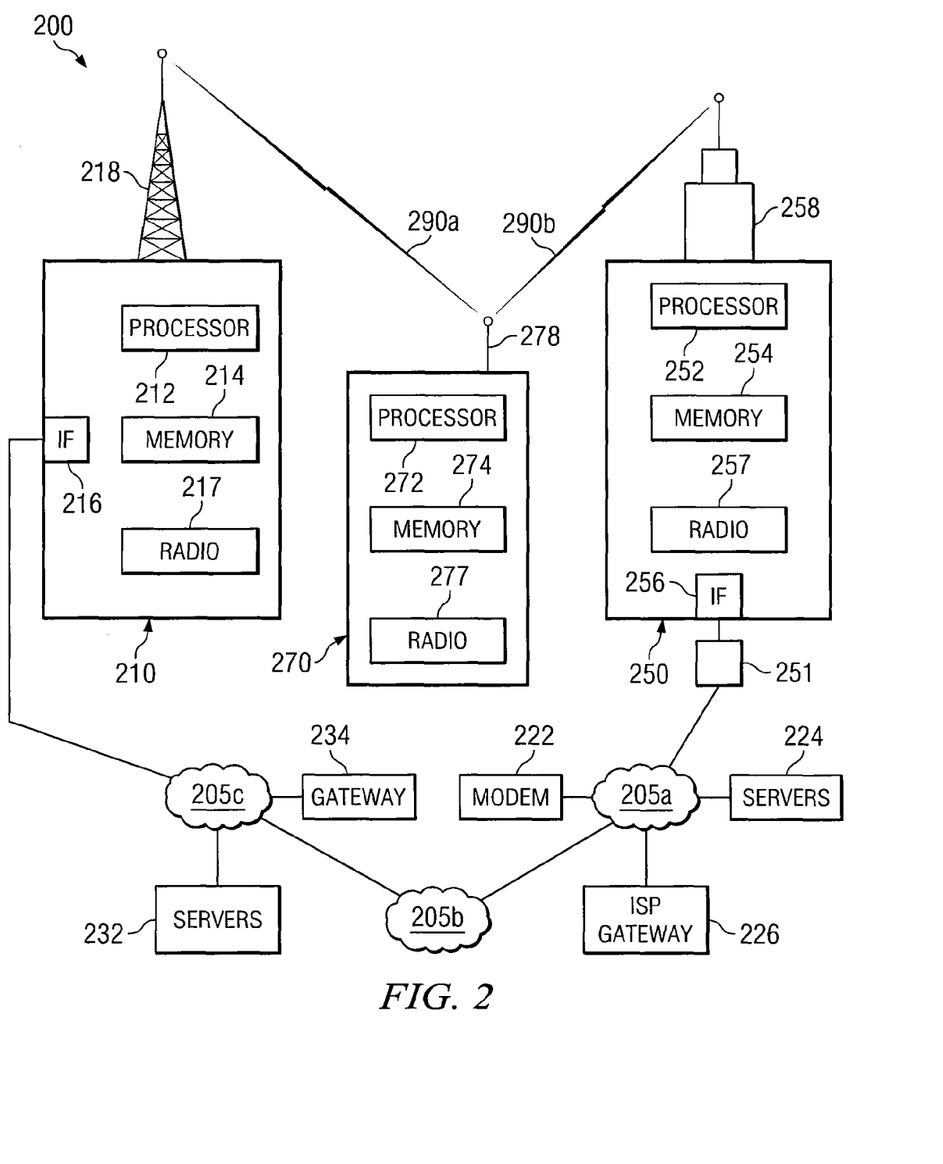
FIG. 2 illustrates a wireless network comprising a more detailed view of an endpoint, a macro base station and a femto base station, in accordance with a particular embodiment.

FIG. 2 illustrates a wireless network comprising a more detailed view of an endpoint, a MBS and a fBS, in accordance with a particular embodiment. More specifically, the depicted embodiment is a simplified network comprising networks 205, MBS 210, fBS 250 and endpoint 270. In different embodiments network 200 may comprise any number of wired or wireless networks, MBSs, endpoints, RSs, fBSs, and/or any other components that may facilitate or participate in the communication of data and/or signals whether via wired or wireless connections. MBS 210 and fBS 250 comprise processors 212 and 252, memory 214 and 254, communication interfaces 216 and 256, radios 217 and 257 and antennas 218 and 258. Similarly, endpoint 270 comprises processor 272, memory 274, radio 277, and antenna 278. These components may work together in order to provide wireless networking functionality, such as providing wireless connections in a wireless network (e.g., a WiMAX wireless network).

Networks 205 may comprise separate but interconnected networks operated by one or more different operators. More specifically, network 205a may be the ISP's network. The owner of fBS 250 may use network 205a for network access, such as to the Internet. In providing the owner with network access, the ISP's network 205a may include modem 222, servers 224, and ISP gateway 226. Modem 222 may be used by the ISP to communicate with the owners modem 251. Thus, modem 251 and modem 222 may have complementary hardware and/or software that may enable them to communicate data between one another. Modem 222 may act as a gateway between the ISP's network 205a and the owner's modem 251. In particular embodiments, modem 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. This may include any hardware and/or software needed to implement security functionality (e.g., a secure tunnel or a virtual private network (VPN) connection).

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b. For example, in particular embodiments, gateway 234 may comprise a security gateway and, behind the security gateway, an ASN gateway. The security gateway and ASN gateway may share all, some, or none of the same hardware components. Gateway 234 may also include security functionality for providing a secure tunnel or VPN connection between fBS 250 and gateway 234. This security functionality may be important to prevent the "snooping" of transmissions from fBS 250 to gateway 234. This may occur when the ISP is a different entity than the WiMAX service provider.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 290a and 290b. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data, instructions, logic or information utilized by MBS 210, fBS 250, and endpoint 270, respectively, including software embedded in a computer readable medium, and/or encoded logic incorporated in hardware or otherwise stored (e.g., firmware). For example, in particular embodiments, memory modules 214, 254, and 274 may store information regarding the spectrum efficiency of one or more particular links. Memory modules 214, 254, and 274 may also maintain a list, database, or other organization of data useful for determining how to route data to the proper component. For example, in some embodiments a tree structure (as opposed to a mesh structure) may be used in routing data from an endpoint to a MBS. More specifically, there may be a known path from MBS 210 to endpoint 270b. This path, or a portion thereof, may be stored in one or more of memory modules 214, 254, and 274. Additional examples of information stored by memory modules 214, 254, and 274 will be discussed below.

Radios 217, 257, and 277 may be coupled to or a part of antennas 218, 258, and 278, respectively. Radios 217, 257, and 277 may receive digital data that is to be sent out to other MBSs, fBSs, RSs and/or endpoints via a wireless connection. Radios 217, 257, and 277 may convert the digital data into a radio signal having the appropriate center frequency and bandwidth parameters. These parameters may be predetermined, for example, by a combination of processor 212 and memory 214 of MBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processors 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between MBS 210 and networks 205, and between fBS 250 and networks 205. For example, communication interface 216 may perform any formatting or translating that may be needed to allow MBS 210 to send and receive data from network 205c over a wired connection. As another example, communication interface 256 may comprise an interface (e.g., RJ-45) that is compatible with a corresponding interface on modem 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via modem 251, to provide the backhaul connection to network 205c, as opposed to the WiMAX service provider supplying the backhaul connection as is the case with MBS 210.

Modem 251 may be used to provide the owner's network access which fBS 250 may utilize for its backhaul connection to WiMAX network 205c. Depending on the type of network service and/or the user's service provider, modem 251 may be a cable modem, a digital subscriber line (DSL) modem, a fiber optic modem, or any other modem, gateway or network access device provided by the owner's network service provider. As may be apparent, the owner may have any number of routers, switches and/or hubs between fBS 250 and modem 251.

As part of establishing a backhaul connection, fBS 250 may communicate with modem 251. Modem 251, which may be provided or authorized by the user's ISP may provide fBS 250 with access to the ISP's network 205a which may then allow access to network 205c, via network 205b. Accessing network 205a may involve modem 251 communicating with the ISP's modem 222.

The ISP may operate one or more servers (e.g., OAM&P, AAA, DHCP) in providing the user with network access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and 0servers 232. Similar to the servers and gateways of ISP network 205a, gateway 234 and servers 232 may ensure that the user has a valid WiMAX account and that network 205c is able to access network 205b. Servers 232 may also contain information, data, instructions and/or logic that may be used to provision various features and functionality of fBS 250. For example, they may provide fBS 250 with channel information for its wireless connection 290b with endpoint 270.

Endpoints 270 may be any type of wireless endpoints able to send and receive data and/or signals to and from MBS 210 and/or fBS 250. Some possible types of endpoints 270 may include desktop computers, PDAs, cell phones, smart phones, laptops, and/or VoIP phones.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several MBSs to provide wireless access for a metropolitan area, or a single MBS may be used with several RSs to provide the necessary coverage. Furthermore, in some embodiments, fBS 250 may have more or less radios. Some embodiments may include additional features.

Figure 3:
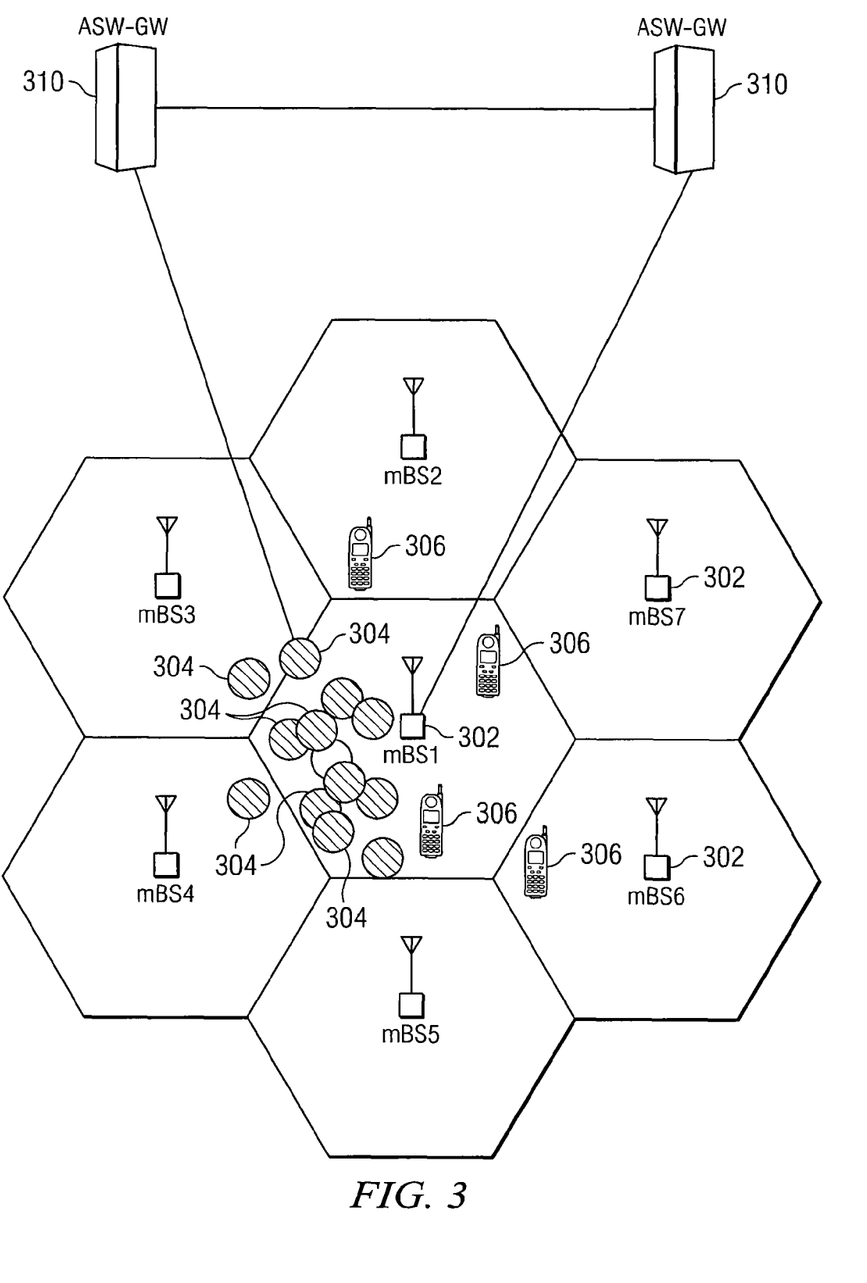
FIG. 3 illustrates a portion of an example wireless network.

FIG. 3 illustrates a portion of a WiMAX or other wireless network 300 that includes a number of macro base stations 302, femto base stations 304, and mobile stations 306. The network may also include ASN gateways 310.

There are two types of fBSs 304: private accessible fBS and public accessible fBS. In the former case, the fBS offers open access to only a closed subscription group (CSG) and does not serve the MSs not belonging to the CSG. For example, the members in a CSG may be the MS devices of the owner of the fBS and/or his/her family/friends/neighbors. On the other hand, the public accessible fBS 304 would potentially serve all MSs 306 that are compatible with the fBS 304 and/or the wireless operator. Publicly accessible fBSs 304 provide wireless operators several benefits. The publicly accessible fBS 304 may provide greater connection quality to the MS 306, reduce bandwidth consumption of the MBS' 302 spectrum, and provide the ability to serve additional MS 306 users using the same equipment. Although network 300 may include privately accessible fBSs, FIG. 3 illustrates only publicly accessible fBSs 304.

A MS 306 is mobile and may move from place to place necessitating handovers from base station to base station. In general, the handover procedure, from a fBS 304 to another fBS 304 or to a MBS 302 utilizes neighbor topology advertisement and/or MS 306 scanning procedures along with certain associated processes. The handover procedure including PHY and MAC operations over an R1 interface as defined in IEEE 802.16(m), Part 16, Amendment 2 and Corrigendum 1 and network operations over R4/R6/R8 interfaces as defined in WiMAX Forum Network Architecture, Release 1.2, Stage 2 and Stage 3 may be adopted to achieve seamless handover from a fBS 304 to another fBS 304 or to a MBS 302 without further modification.

Certain methods such as neighbor topology advertisement and mobile station scanning may be used in a conventional handover procedure. Neighbor topology advertisement utilizes information received by a public fBS 304 or MBS 302 from its ASN gateway 310. The information may include PHY parameters of the target of the handover and may be broadcast by the currently serving base station in a neighbor advertisement (MOB_NBR-ADV) message.

The large number of femto base stations 304 in an area served by a MBS 302 creates a challenge to ensure seamless handover from a MBS 302 to a fBS 304. The coverage area of a fBS 304 is generally small as compared to the coverage area of a MBS 302. In general, there may be a large number of fBSs 304 in an area served by a MBS 302 and thus a much larger number of nearby fBSs 304 than nearby MBSs 302. Due to a much greater number of fBSs 304 within the service area of MBS 302, incorporating fBSs 304 into a neighbor topology advertisement would be bandwidth intensive. Additionally, the neighbor advertisement message in the WiMAX standard is limited to 256 stations and may not accommodate the identification of all fBSs 304 within the service area of MBS 302. Thus it may be impossible to incorporate all fBSs 304 into a single MOB_NBR-ADV message.

In a handover from MBS 302 to public fBS 304 using the unmodified procedures as described in the WIMAX standards listed above, MS 306 does not learn the PHY parameters of public fBS 304 from a MOB_NBR-ADV message. Instead, MS 306 may have to scan the spectrum to identify neighboring base stations such as public fBS 304. Once MS 306 identifies base stations not identified in the MOB_NBR-ADV message, MS 306 may include any newly identified base stations in a MOB_MSHO-REQ message to request handover to one of these base stations. A particular problem with using the unmodified procedures is that the latency of the handover process may be long.

Therefore, it may be desired to have an improved handover and load balancing procedure between MBSs 302 and public fBS 304. Various embodiments provide complementary strategies for providing seamless handover and load balancing between MBSs 302 and public fBSs 304. In certain embodiments, fBSs 304 may be grouped together based on their locations. Grouping fBSs 304 based on the location may permit the use of a MOB_NBR-ADV message that contains only nearby fBSs 304 for broadcast to MS 306. In certain embodiments, MBS 302 may unicast or multicast a customized MOB_NBR-ADV message to each MS 306 based on its location to enable MS 306 to identify nearby fBSs 304. This embodiment is described in further detail with respect to FIGS. 4-5.

In an alternative embodiment, when a particular public fBS 304 determines that it has sufficient capacity to serve MS 306, the particular public fBS 304 may schedule a null zone in an uplink subframe or a null frame to monitor nearby MS' 306 activities. A low mobility MS 306 may be identified and a handover of MS 306 to the public fBS 304 may be initiated. This embodiment is described in further detail with respect to FIGS. 6-8.

Figure 4:
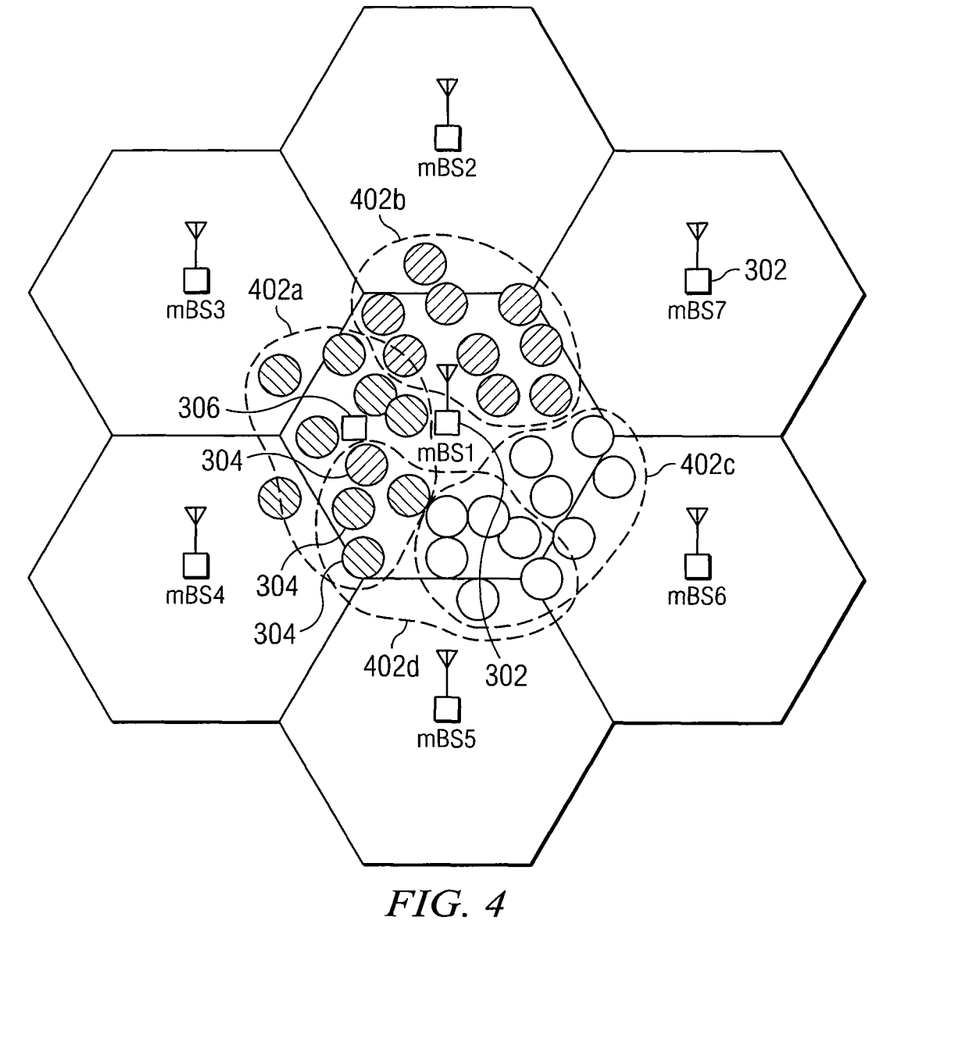
FIG. 4 illustrates a portion of an example wireless network that groups femto base stations based on their locations.

FIG. 4 illustrates a portion of a wireless network that groups fBSs 304 based on their locations. In certain embodiments, the locations of MS 306 and public fBSs 304 may be known to the MBS 302 that covers the area where MS 306 and fBSs 304 are located. Various methods may be used to determine the location of MS 306. For example, if MS 306 is equipped with a global positioning system (GPS) device, MS 306 can report its location to MBS 302. Alternatively, MS 306 could calculate its position based on measurements of the downlink time difference of arrival (D-TDOA) received from neighboring MBSs 302 and the anchor positions of neighbor MBSs 302 received from LBS-ADV messages. A third method may be to have neighboring MBSs 302 coordinate to measure the uplink time difference of arrival from MS 306 and calculate the location of MS 306 from that information. Regardless of the method used to determine MS' 306 location, MBS 302 may send appropriate neighbor base station information to MS 306. This allows the ability to potentially customize MOB_NBR-ADV messages to provide MS 306 information regarding only a nearby group of fBSs 304 that may service MS 306. A multicast or unicast method may be used to send a MOB_NBR-ADV message to a MS 306 that identifies the nearby group, as discussed in further detail below.

Similarly, locations of public fBSs 304 may be determined using any appropriate method. For example, public fBSs 304 are likely to be stationary. Thus, the location of a public fBS 304 could be determined when the public fBS 304 is added to wireless network 300. Alternatively, the location of public fBS 304 could be determined using some or all of the signal measurement techniques described above. Regardless of the method used to determine public fBS' 304 location, the location of public fBSs 304 relative to other public fBSs 304 and MBS 302 in the network may be known.

In certain embodiments, as illustrated in FIG. 4, fBSs 304 may be grouped together based on their locations. This may permit a more optimal transmission of identification information of nearby fBSs 304 to a nearby MS 306. Each group may have its own MOB_NBR-ADV message that can be broadcasted to MS 306. In certain embodiments, MBS 302 or ASN gateway 310 may group fBSs 304 based on their location within MBS' 302 coverage area. Once grouped, each group of fBSs 304 may have their PHY information broadcast to MS 306. For example all the members of fBS group 402a may have their PHY information broadcast to MS 306 in a single MOB_NBR-ADV message when MS 306 is determined to be near fBS group 402a.

In certain embodiments, MBS 302 may partition its coverage area in into a number of zones. Each zone may correspond with a fBS group, such as fBS group 402a, 402b, 402c, and/or 402d. Any MS 306 within the zone may receive a MOB_NBR-ADV as a multicast message from MBS 302. In certain embodiments, MBS 302 may broadcast MOB_NBR-ADV messages for fBS groups 402 that are within a certain distance of MS 306. Thus, MS 306 may only receive messages containing information regarding nearby fBSs 304. In certain embodiments, a MOB_NBR-ADV message may be unicast to a particular MS 306 from MBS 302. The unicast MOB_NBR-ADV message may contain PHY parameters of fBSs 304 near MS 306.

Alternatively, MBS 302 may successively broadcast multiple nearby fBS groups 402 in different MOB_NBR-ADV messages. For example, MBS 302 may broadcast the PHY information for fBS group 402b in a MOB_NBR-ADV message. The next MOB_NBR-ADV message may contain PHY information for fBS group 402c and so forth until each nearby fBS group 402 has been broadcast. MBS 302 may then begin again with fBS group 402a and repeat this process. Under this embodiment, MS 306 may need to wait for a longer interval to receive information for all nearby fBSs 304. However, upon receipt of PHY parameters at MS 306, MS 306 may begin scanning the spectrum to see if any fBS 304 for which MS 306 has PHY parameters is close enough for MS 306 to be handed over.

In certain embodiments, a particular fBS 304 may be assigned to more than one group. For example, fBS group 402d overlaps with certain fBSs 304 in fBS groups 402a and 402c. This overlapping may allow MBS 302 to provide better neighboring fBS information to MS 306. For example, if MS' 306 position is near the border of fBS group 402a and 402c, receiving the PHY parameters of one of the two fBS groups (the group in which MS 306 is presently located) would not provide information regarding a number of the nearby public fBSs 304. fBS group 402d, however, contains public fBSs 304 that border fBS groups 402a and 402c. Thus, a MS 306 receiving information for fBS group 402d would be provided better information regarding neighboring fBSs 304 than receiving either fBS group 402a or 402c. In certain embodiments, MBS 302 may broadcast MOB_NBR-ADV messages for multiple groups that are within a certain distance of MS 306. For example, in this embodiment, MBS 302 may broadcast to MS 306 information regarding fBS groups 402a and 402c.

Figures 5, 8:
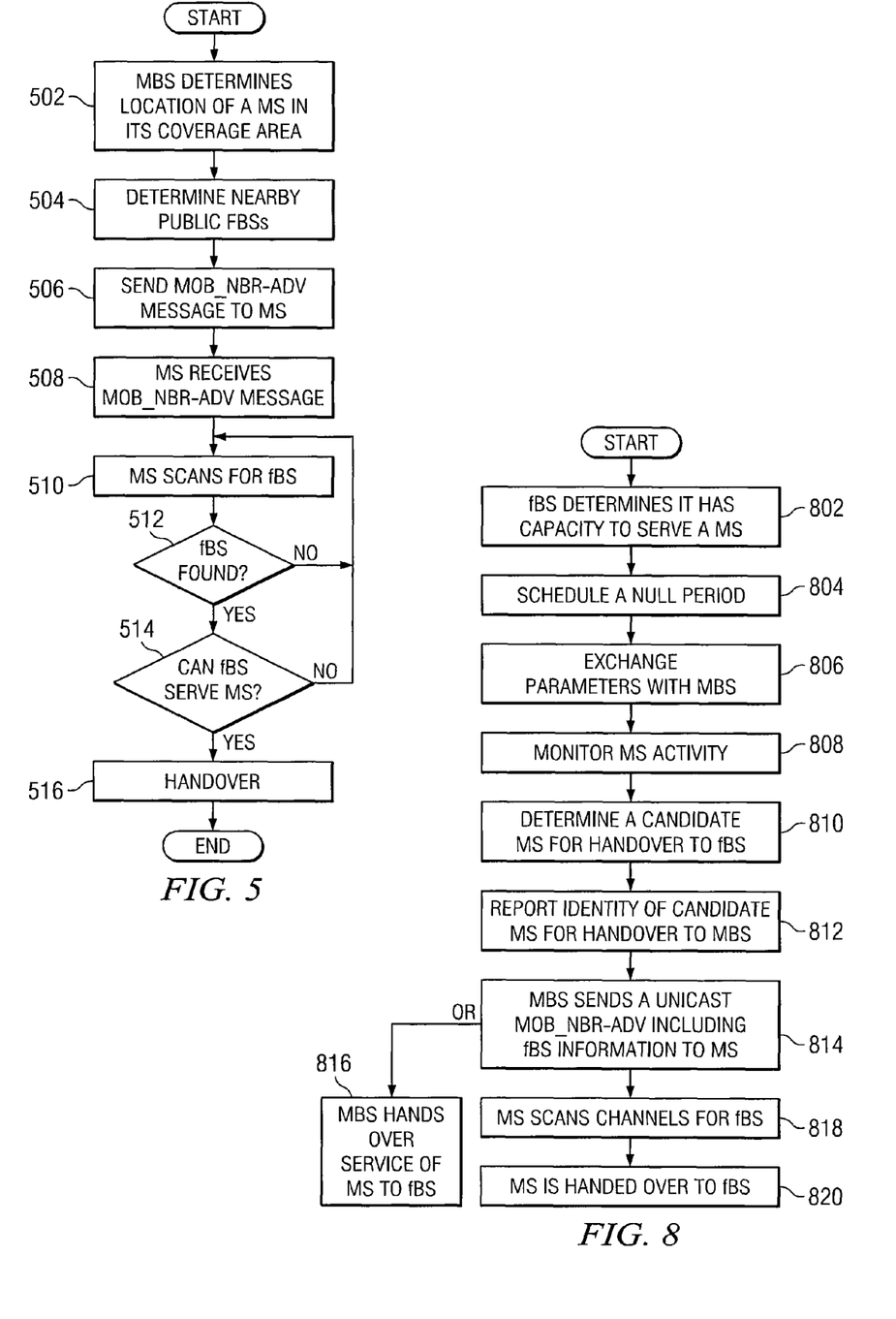
FIG. 5 is a flowchart illustrating a method for seamless handover between a macro base station and publicly accessible femto base stations using the groups of femto base stations and a mobile station's location.
FIG. 8 is a flowchart illustrating a method for seamless handover between a macro base station and publicly accessible femto base stations using femto base station-assisted monitoring of mobile station activity.

FIG. 5 is a flowchart illustrating a method for seamless handover between a macro base station and publicly accessible femto base stations using fBS group advertising. It is assumed that a setup phase has occurred. The setup phase groups the public fBSs 304 by location. For example, this grouping may occur when a new public fBS 304 is added to the wireless network. As public fBS 304 are added, the public fBSs 304 are included in one or more groups according to their locations within the coverage area of MBS 302, such that nearby public fBSs 304 are grouped together.

The method of FIG. 5 begins at step 502, where a MBS 302 determines the location of a particular MS 306 in its coverage area. This may be through use of GPS, transmission time delay, reception time delay, or other appropriate methods. At step 504, MBS 302 may determine which public fBSs 304 that are near MS 306. For example, MBS 302 may determine that MS 306 within the boundaries of a particular fBS group 402. MBS 302 may use the information about the locations of public fBSs 304 gathered during the grouping process. Information regarding the locations and identification information of fBS group 402 may be stored at the MBS 302 or ASN gateway 310.

At step 506, a MOB_NBR-ADV message may be sent by MBS 302 to MS 306. This MOB_NBR-ADV message may be multicast or unicast. A multicast message containing identification information of the fBS group 402 may be sent to all MS 306 that are located within the coverage area of the particular fBS group 402 and/or nearby fBS groups 402. A unicast message to a particular MS 306, on the other hand, may be further customized to send identification information regarding public fBSs 304 that are near the MS 306. These public fBSs 304 may be individually chosen for their proximity to MS 306 or as part of a fBS group 402.

At step 508, MS 306 receives the MOB_NBR-ADV message. At step 510, MS 306 may begin scanning for a public fBS 304 identified in the MOB_NBR-ADV message. At step 512, if a public fBS 304 is not found after a predetermined period of time, MS may pause scanning and resume after some predetermined period of time has passed, otherwise MS 306 continues scanning for a public fBS 304 until one is found. If a public fBS 304 is found, MS 306 may request to be handed over to the found public fBS 304. At step 514, a determination is made if public fBS 304 has the ability to serve MS 306. A public fBS 304 may not be able to serve MS 306 for a variety of reasons including that it is at its service capacity. If MS 306 is not able to be handed over to public fBS 304, MS 306 would continue scanning for another public fBS 304. If public fBS 304 is able to service MS 306, a handover of service from MBS 302 to public fBS 304 occurs at step 516.

Figure 6:
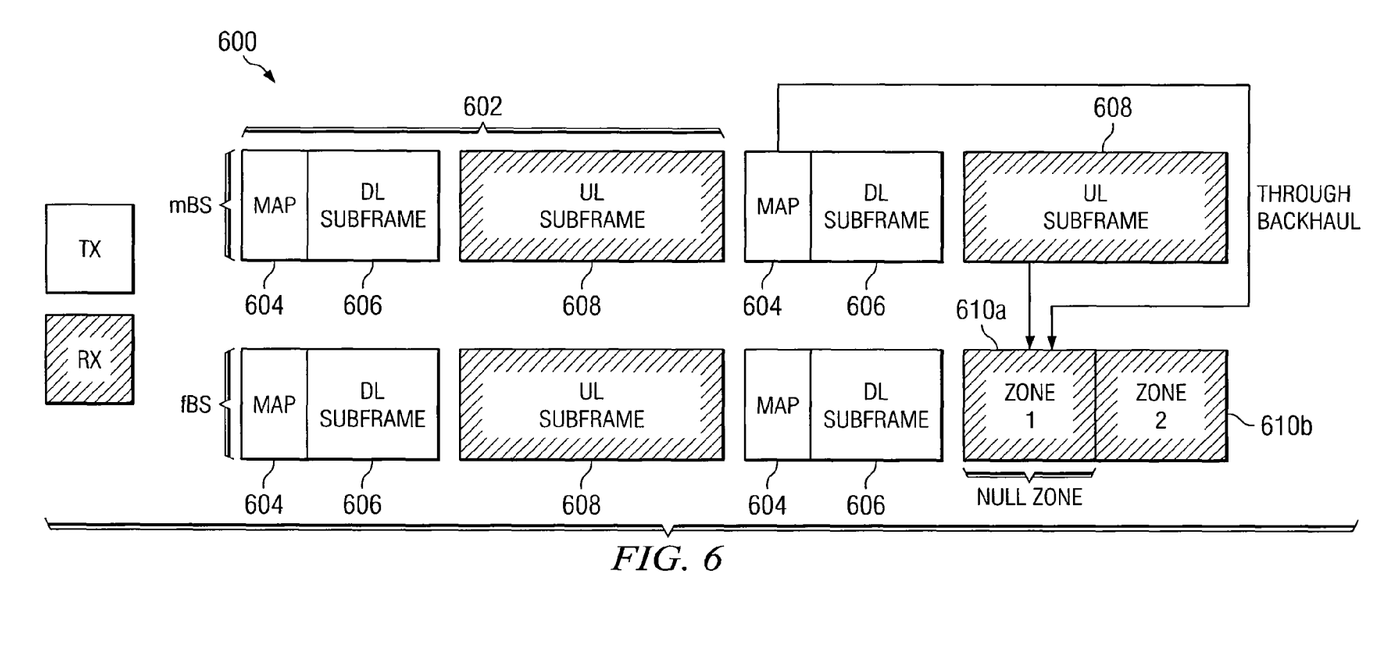
FIGS. 6-7 illustrate timing diagrams of communications of a macro base station and a publicly accessible femto base station using a femto base station assisted handover method.
Figure 7:
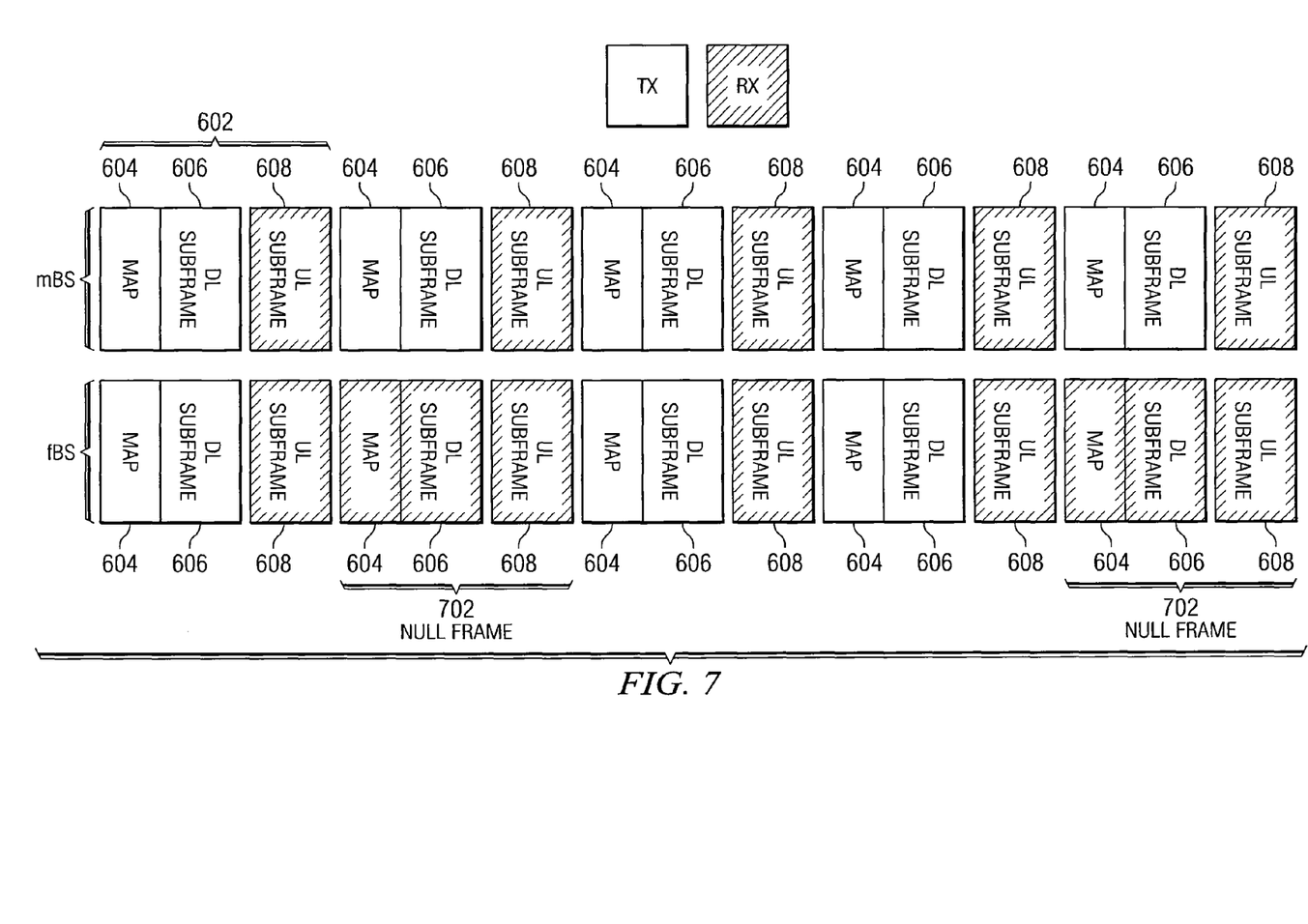

FIGS. 6-8 illustrate an alternative method for providing seamless handover from a MBS 302 to a publicly accessible fBS 304. Instead of relying on knowing the location of MS 306, when public fBS 304 has the ability to serve another MS 306, public fBS 304 may actively scan for the presence of a nearby MS 306. Alternatively, MBS 302 may request or receive reports regarding the traffic load of public fBS 304. MBS 302 may then request or require public fBS 304 to initiate active scanning for the presence of nearby MS 306 to serve. The method of using active scanning by fBS 304 to determine candidates for handover may be referred to as fBS assisted handover.

FIGS. 6-7 illustrate timing diagrams of communications between MBS 302 and public fBS 304 using a fBS assisted handover method. A timing diagram illustrates the communications periods of MBS 302 and public fBS 304. Communications periods may be referred to as frames. A frame may consist of a MAP and uplink and downlink subframes. Communications between MBS 302 and fBS 304 occur routinely. For example, public fBS 304 may transmit a message indicating that a particular MS 306 is leaving its coverage area and requires a handover. The timing diagram assumes that the MBS 302 and public fBS 304 are time synchronized.

In fBS assisted handover, public fBS 304 may determine that it has sufficient capacity to serve a MS 306 and attempt to identify one or more MSs 306 that it may be able to serve. To do this, public fBS 304 may schedule a null zone in an uplink subframe or a null frame to monitor nearby MS' 306 activities. A null zone or null frame is a period where public fBS 304 does not have scheduled communications with any MS 306 currently served by public fBS 304. During the null zone or null frame, public fBS 304 monitors the spectrum for the presence of a MS 306. The presence of a MS 306 may be identified through several means including bandwidth request headers, generic MAC headers (GMH), DL-MAP and UL-MAP messages, or other messages that include a connection identifier (CID) of MS 306. During the null zone or null frame, public fBS 304 does not schedule any uplink transmissions for any MS 306 currently served by public fBS 304.

Additionally, because different base stations may use different subcarrier allocations and permutations, public fBS 304 may need to change its subcarrier allocation and permutations during the null zone or null frame in order to correctly decode any received messages. A subcarrier is a separate signal carried on a main transmission. In general, a subcarrier is a modulated signal that is then modulated onto another signal of higher frequency and bandwidth. This may allow multiple signals to exist simultaneously on a single transmission. Different base stations may be assigned different subcarrier allocations and permutations in order to keep transmissions from each base station separated. To identify the proper subcarrier allocation and permutations, public fBS 304 and MBS 302 may exchange information prior to the null zone or null frame. During this exchange of information, parameters of the null zone or null frame may also be exchanged. Parameters exchanged with MBS 302 may include the period of the null zone within a frame unit and location of the null zone that may include information such as the symbol length and offset. This exchange of information may be performed through the air interface between fBS 304 and MBS 302 or using backhaul communications between MBS 302 and public fBS 304 such as through a network access device coupling the fBS to the wireless service provider networks as discussed in conjunction with FIG. 2.

In this embodiment, the serving MBS 302 may not need to identify which public fBSs 304 are close to MS 306. Instead, MBS 302 may rely on public fBSs 304 in its coverage area to monitor MS' 306 activities in the uplink subframes and to determine MS 306 that they may serve.

FIG. 6 illustrates a timing diagram with a null zone the fBS' uplink subframe as mentioned above. A number of frames and subframes are illustrated. It is assumed and illustrated that MBSs 302 and public fBSs 304 are time synchronized and the boundaries of the downlink and uplink subframes are aligned within the macro and femto base station coverage areas. For example, a frame 602 comprises a MAP 604, downlink (DL) subframe 606, and uplink (UL) subframe 608. Subframes may be further divided into zones. For example, an uplink subframe 608 may be divided into two zones 610a and 610b. Null zone may be scheduled in zone 610a in uplink subframe 608. Zone 610b may continue to function as an uplink subframe 608. Alternatively, the null zone could encompass the entire uplink subframe 608.

In this embodiment, public fBS 304 does not schedule any uplink transmissions for any MS 306 that is currently served by public fBS 304 during null zone 610a. Instead, public fBS 304 adjusts its subcarrier allocation and permutations to be aligned with MBS' 302 subcarrier allocation and permutations. A UL-MAP message may be sent by MBS 302 over a backhaul to public fBS 304 so that public fBS 304 can correctly decode uplink bursts during the null zone. An uplink burst may be a transmission by a MS 306 to MBS 302. Thus, public fBS 304 may then be able to determine the identity of a MS 306 that is transmitting within its coverage area.

FIG. 7 illustrates a timing diagram of UL and DL subframes for a MBS 302 and an fBS 304 in its coverage area. Similar to FIG. 6, FIG. 7 illustrates frames 602, MAP 604, downlink subframe 606, and uplink subframe 608. Unlike FIG. 6, however, FIG. 7 illustrates the use of a null frame 702. Instead of using all or a portion of a subframe as the null zone 610 as described with respect to FIG. 6, a null frame 702 utilizes the entire frame for monitoring the spectrum for the presence of MS 306. In this particular embodiment, public fBS 304 may stop transmitting its preamble, DL-MAP, and UL-MAP messages during null frame 702. Instead, DL-MAP and UL-MAP messages from MBS 302 may be received directly over an air interface or through the backhaul. A particular advantage of using null frame 702 may be the ability to monitor both the downlink and uplink subframes for MSs 306 and avoid UL-MAP messages being sent by MBS 302 to public fBS 304 over a backhaul.

Regardless of whether a null zone 610a or null frame 702 is used, during the null monitoring intervals, public fBS 304 may identify that a particular MS 306 is frequently within public fBS' 304 coverage area. This may be an indication that MS 306 is not significantly moving within the coverage area of public fBS 304 and may also indicate that a stable link could exist between MS 306 and public fBS 304. Public fBS 304 may transmit a message that it has identified a potential candidate for handover to the serving MBS 302 via the backhaul or other methods. The serving MBS 302 may then unicast a customized MOB_NBR-ADV message containing the identification information and PHY parameters of public fBS 304 and an unsolicited scanning request (MOB_SCN-RSP) to MS 306 to trigger the scanning of the spectrum. Serving MBS 302 may also initiate an unsolicited handover request (MOB_BSHO-REQ) message recommending that MS 306 handover to public fBS 304. Although both methods for initiating handover could be used, in general, only one of the above methods is used.

In operation of fBS assisted handover, fBS 304 may determine it is able to serve an additional MS 306. For example, public fBS 304 may be able to serve thirty MSs 306. If a MS 306 ceases to be served by public fBS 304, for example, a handover of service to a MBS 302, public fBS 304 will have sufficient capacity to serve another MS 306. A null period may be scheduled to identify a low mobility MS 306. After identification of a low mobility MS 306, a handover of MS 306 to public fBS 304 may be initiated.

FIG. 8 is a flowchart illustrating a method for seamless handover between a macro base station 302 and publicly accessible femto base stations 304 using fBS-assisted monitoring of MS 306 activity. At step 802, public fBS 304 may determine it has the capacity to serve additional MSs 306. At step 804, public fBS 304 schedules a null zone or null frame. At step 806, parameters of the null zone or frame are exchanged with MBS 302. At step 808, public fBS 304 monitors MS 306 activity during the null zone or null frame. At step 810, public fBS 304 determines one or more MS 306 that are candidates for handover to public fBS 304. For example, a candidate for handover may be a MS 306 that is frequently monitored by public fBS 304 during successive null periods. At step 812, public fBS 304 reports to MBS 302 the identity of a candidate MS 306. At step 814, MBS 302 sends a unicast MOB_NBR-ADV message, including identification information of public fBS 304 to the particular MS 306 that was identified by public fBS 304.

At this point two processes may occur. These processes are not mutually exclusive, but generally only one process would be performed. In the first procedure, at step 816, MBS 302 initiates an unsolicited handover request by sending a MOB_BSHO-REQ message to MS 306. By sending an unsolicited handover request to MS 306, MBS 302 indicates to MS 306 that it intends to hand over service of MS 306 to the indicated base station. Alternatively, at step 818, MS 306 may begin to scan for the identified public fBS 304 upon receipt of the unsolicited MOB_SCN-RSP message. MS 306 may use the identification information of the public fBS 304 included in the MOB_NBR-ADV or MOB_SCN-RSP message to locate public fBS 304. At step 820, once the public fBS 304 is found, MS 306 may initiate a handover of service from MBS 302 to public fBS 304.

Although certain embodiments have been primarily described with respect to MBS 302 and public fBS 304 performing certain tasks, other components of such as ASN gateway 310 or other suitable components are contemplated. For example, in particular implementations of system 300, certain tasks, such as storage of fBS group 402 information, may be performed at the ASN gateway 310 or the location of the radio resource controller.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:
1. A method, comprising:
transmitting traffic load information from a femto base station to a macro base station;
receiving a request from the macro base station to schedule a null period for monitoring of mobile station activity at the femto base station based on the traffic load informa- tion, wherein the null period is one of a null zone in an uplink subframe or a null frame;

scheduling the null period in the femto base station's communications activity;

monitoring mobile activity during the null period at the femto base station; identifying a candidate mobile station based on the monitoring;

transmitting an identifier of the candidate mobile station from the femto base station to the macro base station to initiate handover of service of the candidate mobile station from the macro base station to the femto base station.

2. The method of claim 1, further comprising:
determining that the femto base station has capacity to service the candidate mobile station.

3. The method of claim 1, wherein the macro base station initiates an unsolicited handover request to the candidate mobile station, the unsolicited handover request initiating a handover of service to the femto base station.

4. The method of claim 1, further comprising:
receiving at the candidate mobile station from the macro base station identification information associated with the femto base station that identified the candidate mobile station;
scanning for the femto base station by the candidate mobile station; and
initiating by the mobile station a handover of service from the macro base station to the femto base station after the mobile station identifies the femto base station.

5. The method of claim 1, further comprising changing a subcarrier allocation associated with the femto base station during the null period.

6. The method of claim 5, wherein the subcarrier allocation associated with the femto base station during the null period is aligned with a subcarrier allocation associated with the macro base station.

7. The method of claim 6, wherein aligning the subcarrier allocation comprises aligning a permutation associated with the macro base station.

8. The method of claim 1, wherein the null period comprises a portion of an uplink subframe.

9. The method of claim 1, wherein the candidate mobile station is determined by being frequently monitored mobile station.

10. A wireless communications system, comprising:
a femto base station operable to:
transmit traffic load information from a femto base station to a macro base station;
receive a request from the macro base station to schedule a null period for monitoring of mobile station activity at the femto base station on the traffic load information, wherein the null period is one of a null zone in an uplink subframe or a null frame;
schedule the null period in the femto base station's communications activity;
monitor mobile station activity during the null period at the femto base station;
identify a candidate mobile station based on the monitoring;
transmit an identifier of the candidate mobile station from the femto base station to the macro base station to initiate handover of service of the candidate mobile station from the macro base station the femto base station.

11. The system of claim 10, wherein the femto base station is further operable to:
determine that the femto base station has capacity to service the candidate mobile station.

12. The system of claim 10, further comprising: the macro base station; and
wherein the macro base station initiates an unsolicited handover request to the candidate mobile station.

13. The system of claim 10, further comprising: the macro base station, wherein the macro base station is operable to:
transmit identification information associated with the femto base station that identified the candidate mobile station; and
the candidate mobile station, wherein the candidate mobile station is operable to:
scan for the femto base station; and
initiate a handover of service from the macro base station to the femto base station after the mobile station identifies the femto base station.

14. The system of claim 10, further comprising:
the candidate mobile station, wherein the candidate mobile station is operable to:
receive identification information associated with the femto base station that identified the candidate mobile station;
initiate a scan for the femto base station; and
initiate a handover of service from the macro base station to the femto base station after the mobile station identifies the femto base station.

15. The system of claim 10, wherein the femto base station is further operable to:
change a subcarrier allocation associated with the femto base station during the null period.

16. The system of claim 15, wherein the subcarrier allocation associated with the femto base station during the null period is aligned with a subcarrier allocation associated with the macro base station.

17. The system of claim 16, wherein aligning the subcarrier allocation comprises aligning a permutation associated with the macro base station.

18. The system of claim 10, wherein the null period comprises a portion of an uplink subframe.

19. The system of claim 10, wherein the candidate mobile station is determined by being a frequently monitored mobile station.

* * * * *

UNITED STATES PATENT AND TRADEMARK OFFICE
CERTIFICATE OF CORRECTION

PATENT NO.        : 8,688,117 B2                                Page 1 of 1
APPLICATION NO.   : 12/395823
DATED             : April 1, 2014
INVENTOR(S)       : Wei-Peng Chen et al.

It is certified that error appears in the above-identified patent and that said Letters Patent is hereby corrected as shown below:

In the Claims

Col. 17, Ln. 51: After "station" and before "on" insert --based--.

Signed and Sealed this
Fourteenth Day of October, 2014

Michelle K. Lee
*Deputy Director of the United States Patent and Trademark Office*